(12) United States Patent
Ravi et al.

(10) Patent No.: US 10,686,321 B2
(45) Date of Patent: Jun. 16, 2020

(54) SECONDARY BATTERY MANAGEMENT

(71) Applicant: Robert Bosch GmbH, Stuttgart (DE)

(72) Inventors: Nikhil Ravi, Mountain View, CA (US); Anahita MirTabatabaei, San Francisco, CA (US); Reinhardt Klein, Mountain View, CA (US); Ashish Krupadanam, Cupertino, CA (US); John F. Christensen, Elk Grove, CA (US); Aleksandar Kojic, Sunnyvale, CA (US); Sarah Stewart, San Francisco, CA (US); Sun Ung Kim, Fremont, CA (US); Christina Johnston, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 656 days.

(21) Appl. No.: 15/010,873

(22) Filed: Jan. 29, 2016

(65) Prior Publication Data

US 2017/0222447 A1  Aug. 3, 2017

(51) Int. Cl.
*H02J 7/00* (2006.01)
*H01M 10/42* (2006.01)
(Continued)

(52) U.S. Cl.
CPC ......... *H02J 7/0063* (2013.01); *H01M 10/425* (2013.01); *H01M 10/44* (2013.01);
(Continued)

(58) Field of Classification Search
CPC ...... H02J 7/0063; H02J 7/0021; H02J 7/0072; H01M 10/44; H01M 10/48; H01M 10/052;
(Continued)

(56) References Cited

U.S. PATENT DOCUMENTS 6,515,456 B1   2/2003  Mixon
6,534,954 B1 * 3/2003  Plett ................. G01R 31/367
                                                      320/132
(Continued)

FOREIGN PATENT DOCUMENTS

DE   102005008511 A1   8/2006
EP        2816366 A1  12/2014
(Continued)

OTHER PUBLICATIONS

B. F. Lund and B. A. Foss, "Parameter ranking by orthogonalization—Applied to nonlinear mechanistic models," Automatica, vol. 44, No. 1, pp. 278-281, 2008.
(Continued)

*Primary Examiner* — Richard Isla
*Assistant Examiner* — Johali A Torres Ruiz
(74) *Attorney, Agent, or Firm* — Michael Best & Friedrich LLP

(57) ABSTRACT

A method of managing a battery system, the battery system including at least one battery cell, at least one sensor configured to measure at least one characteristic of the battery cell, and a battery management system including a microprocessor and a memory, the method comprising receiving by the battery management system, from the at least one sensor at least one measured characteristic of the battery cell at a first time and at least one measured characteristic of the battery cell at a second time. The battery management system estimating, at least one state of the battery cell by applying a physics-based battery model, the physics based battery model being based on differential algebraic equations; and regulating by the battery management system, at least one of charging or discharging of the battery cell based on the at least one estimated state.

18 Claims, 5 Drawing Sheets

(51) Int. Cl.
  *H01M 10/48* (2006.01)
  *H01M 10/44* (2006.01)
  *H01M 10/052* (2010.01)

(52) U.S. Cl.
  CPC ........... *H01M 10/48* (2013.01); *H02J 7/0021* (2013.01); *H02J 7/0072* (2013.01); *H01M 10/052* (2013.01); *H01M 10/4257* (2013.01); *H01M 2010/4271* (2013.01); *H02J 2007/0067* (2013.01); *Y02T 10/7055* (2013.01)

(58) Field of Classification Search
  CPC ............ H01M 10/425; G01R 31/3606; G01R 31/3655
  USPC ......................................................... 320/134
  See application file for complete search history.

(56) References Cited

U.S. PATENT DOCUMENTS

| | | |
|---|---|---|
| 7,612,532 B2 | 11/2009 | Verbrugge |
| 7,994,755 B2 | 8/2011 | Plett |
| 8,008,891 B2 | 8/2011 | Yun et al. |
| 8,103,485 B2 | 1/2012 | Plett |
| 8,116,998 B2 | 2/2012 | Hess |
| 8,188,715 B2 | 5/2012 | Christensen et al. |
| 8,310,201 B1 | 11/2012 | Wright |
| 8,321,164 B2 | 11/2012 | Liu et al. |
| 8,346,495 B2 | 1/2013 | Gering |
| 8,467,984 B2 | 6/2013 | Gering |
| 8,548,762 B2 | 10/2013 | Prada et al. |
| 8,635,038 B2 | 1/2014 | Benjamin et al. |
| 8,896,315 B1 | 11/2014 | Davies |
| 8,965,723 B2 | 2/2015 | Jo et al. |
| 9,086,462 B2 | 7/2015 | Mao |
| 10,107,865 B2 | 10/2018 | Choi |
| 10,224,579 B2 | 3/2019 | Christensen et al. |
| 2001/0032666 A1 | 10/2001 | Jenson et al. |
| 2002/0097026 A1 | 7/2002 | Kernahan et al. |
| 2003/0076109 A1 | 4/2003 | Verbrugge et al. |
| 2004/0135548 A1 | 7/2004 | Takano et al. |
| 2004/0220758 A1 | 11/2004 | Barsoukov et al. |
| 2006/0111854 A1 | 5/2006 | Plett |
| 2006/0170397 A1 | 8/2006 | Srinivasan et al. |
| 2006/0284600 A1 | 12/2006 | Verbrugge |
| 2007/0299620 A1 | 12/2007 | Yun et al. |
| 2008/0074082 A1 | 3/2008 | Tae et al. |
| 2008/0103709 A1 | 5/2008 | Yun et al. |
| 2008/0281244 A1 | 11/2008 | Jacobs |
| 2009/0210179 A1 | 8/2009 | Tang et al. |
| 2009/0326842 A1 | 12/2009 | Thomas-Alyea |
| 2010/0033132 A1 | 2/2010 | Nishi et al. |
| 2010/0085057 A1* | 4/2010 | Nishi .................... H01M 10/44 324/427 |
| 2011/0025258 A1 | 2/2011 | Kim et al. |
| 2011/0288797 A1 | 11/2011 | Schmidt |
| 2012/0101753 A1 | 4/2012 | Lin et al. |
| 2012/0105001 A1 | 5/2012 | Gallegos et al. |
| 2012/0109443 A1* | 5/2012 | Takahashi ............... B60L 1/003 701/22 |
| 2012/0150507 A1 | 6/2012 | Gallestey et al. |
| 2012/0175953 A1 | 7/2012 | Ohkawa et al. |
| 2012/0268074 A1 | 10/2012 | Cooley et al. |
| 2012/0299552 A1 | 11/2012 | Machida |
| 2012/0306438 A1 | 12/2012 | Howard et al. |
| 2012/0313449 A1 | 12/2012 | Kurs et al. |
| 2013/0006454 A1 | 1/2013 | Li et al. |
| 2013/0051587 A1 | 2/2013 | Stephanou et al. |
| 2013/0085696 A1 | 4/2013 | Xu et al. |
| 2013/0086409 A1 | 4/2013 | Lu et al. |
| 2013/0300190 A1 | 11/2013 | Mao et al. |
| 2013/0300377 A1 | 11/2013 | Mao et al. |
| 2013/0322488 A1 | 12/2013 | Yazami et al. |
| 2014/0015488 A1 | 1/2014 | Despesse |
| 2014/0055488 A1 | 2/2014 | Masters |
| 2014/0089692 A1 | 3/2014 | Hanafusa |
| 2014/0222358 A1 | 8/2014 | Morita et al. |
| 2014/0225620 A1 | 8/2014 | Campbell et al. |
| 2014/0229129 A1 | 8/2014 | Campbelle et al. |
| 2014/0236511 A1 | 8/2014 | Kulkarni et al. |
| 2014/0244225 A1 | 8/2014 | Balasingam et al. |
| 2014/0278167 A1 | 9/2014 | Frost et al. |
| 2014/0342193 A1 | 11/2014 | Mull et al. |
| 2014/0350877 A1 | 11/2014 | Chow et al. |
| 2015/0022157 A1* | 1/2015 | Takahashi ........... H01M 10/482 320/134 |
| 2015/0046106 A1 | 2/2015 | Wade et al. |
| 2015/0046108 A1 | 2/2015 | Akamine |
| 2015/0066406 A1 | 3/2015 | Sun et al. |
| 2015/0147608 A1 | 5/2015 | Lin et al. |
| 2015/0197164 A1 | 7/2015 | Lee |
| 2015/0226807 A1 | 8/2015 | Aumentado et al. |
| 2015/0234013 A1 | 8/2015 | Migita et al. |
| 2015/0248149 A1 | 9/2015 | Yamazaki et al. |
| 2015/0251555 A1 | 9/2015 | Li et al. |
| 2015/0251556 A1 | 9/2015 | Meyer |
| 2015/0260800 A1 | 9/2015 | Baba et al. |
| 2015/0268306 A1 | 9/2015 | Sugiyama et al. |
| 2015/0302723 A1 | 10/2015 | Reade et al. |
| 2015/0326038 A1 | 11/2015 | Lee |
| 2015/0355615 A1* | 12/2015 | Lee ...................... G01R 31/007 700/275 |
| 2016/0046199 A1 | 2/2016 | Butler et al. |
| 2016/0090001 A1 | 3/2016 | Nomoto et al. |
| 2016/0241058 A1* | 8/2016 | Carralero .............. H02J 7/0029 |
| 2016/0259011 A1* | 9/2016 | Joe ........................ H01M 10/48 |
| 2017/0144562 A1 | 5/2017 | Thomas et al. |
| 2017/0222449 A1 | 8/2017 | MirTabatabaei et al. |
| 2017/0271984 A1 | 9/2017 | Kohn et al. |
| 2018/0313904 A1 | 11/2018 | Heiries et al. |

FOREIGN PATENT DOCUMENTS

| | | |
|---|---|---|
| KR | 20150043214 | 4/2015 |
| WO | 2006057469 A1 | 6/2006 |
| WO | WO 2006/057468 | 6/2006 |
| WO | WO 2008/154956 | 12/2008 |
| WO | 2011050924 A1 | 5/2011 |
| WO | WO 2014/130519 | 8/2014 |
| WO | 2015025212 A1 | 2/2015 |
| WO | WO 2015/056963 | 4/2015 |
| WO | WO 2015/056964 | 4/2015 |
| WO | 2015185802 A1 | 12/2015 |

OTHER PUBLICATIONS

Fuller et al., "Simulation and Optimization of the Dual Lithium Ion Insertion Cell," J. Electrochem. Soc., vol. 141, No. 1, Jan. 1994, pp. 1-10.
Ioannou et al., "Robust adaptive control." Courier Corporation, 2012.
K. Thomas, J. Newman and R. Darling, "Mathematical Modeling of Lithium Batteries," Kluwer Academic/Plenum Publishers, pp. 345-392, 2002.
Klein, R. et al., 2013. "Electrochemical Model Based Observer Design for a Lithium-Ion Battery." Control Systems Technology, IEEE Transactions on, 21(2), pp. 289-301.
M. Doyle, T.F. Fuller, J. Newman, "Modeling of Galvanostatic Charge and Discharge of the Lithium/Polymer/Insertion Cell", Journal of the Electrochemical Society, 1993.
Mayhew et al., "Investigation of projection-based model-reduction techniques for solid-phase diffusion in Li-ion batteries," American Control Conference (ACC), 2014 , pp. 123-128, Jun. 4-6, 2014.
Moura et al., "Adaptive PDE Observer for Battery SOC/SOH Estimation," ASME 2012 5th Annual Dynamic Systems and Control Conference joint with the JSME 2012 11th Motion and Vibration Conference, 2012 (10 pages).
Murray, Chapter 3, State Estimation, Caltech, https://www.cds.caltech.edu/~murray/wiki/images/b/b3/Stateestim.pdf) available online as early as Sep. 20, 2006, pp. 9-17.

(56) References Cited

OTHER PUBLICATIONS

N. Chaturvedi, et al., "Modeling, estimation, and control challenges for lithium-ion batteries," 2010 American Control Conference, pp. 1997-2002, 2010.
N. Chaturvedi, J. Christensen, R. Klein and A. Kojic, "Approximations for Partial Differential Equations Appearing in Li-Ion Battery Models," ASME 2013 Dynamic Systems and Control Conference (10 pages).
N. Chaturvedi, R. Klein, J. Christensen, J. Ahmed and A. Kojic, "Algorithms for Advanced Battery Management Systems," IEEE Control Systems Magazine, vol. 30, No. 3, pp. 49-68, 2010.
Pattel, "An Evaluation of the Moving Horizon Estimation Algorithm for Online Estimation of Battery State of Charge and State" Thesis, Purdue University, Dec. 2014.
Ramadesigan et al., "Modeling and Simulation of Lithium-Ion Batteries from a Systems Engineering Perspective," Journal of The Electrochemical Society, 159 (3) R3 1-R45 (2012).
Rao, C. V., Rawlings, J. B., & Mayne, D. Q. (2003). "Constrained state estimation for nonlinear discrete-time systems: Stability and moving horizon approximations." Automatic Control, IEEE Transactions, 48(2), 246-258.
Tenny, M. J., & Rawlings, J. B. (2002). "Efficient moving horizon estimation and nonlinear model predictive control." In American Control Conference, 2002. Proceedings of the 2002 (vol. 6, pp. 4475-4480). IEEE.
Thomas, "Lithium-Ion Batteries: Thermal and Interfacial Phenomena," Dissertation, Princeton University, 1996, published 2002, pp. 66-73.
Notice of Allowance from U.S. Appl. No. 15/273,040 dated Feb. 4, 2019 (8 pages).
Written Opinion of the International Searching Authority for Application No. PCT/EP2017/051333 dated May 9, 2017 (10 pages).
International Search Report for Application No. PCT/EP2017/051325 dated Apr. 7, 2017 (5 pages).
Ma Yan et al., "Lithium-ion Battery State of Charge Estimation based on Moving Horizon", Proceedings of the 11th World Congress on Intelligent Control and Automation, Jun. 29, 2014 (Jun. 29, 2014),—Jul. 4, 2014 (Jul. 4, 2014), pp. 5002-5007.
Sridhar Ungarala, "Computing arrival cost parameters in moving horizon estimation using sampling based filters", Journal of Process Control, vol. 19, No. -9, Oct. 2009 (Oct. 2009), pp. 1576-1588.

\* cited by examiner

SECONDARY BATTERY MANAGEMENT

STATEMENT REGARDING FEDERALLY SPONSORED RESEARCH

This invention was made with government support under ARPA-E Award Number DE-AR0000278 awarded by the U.S. Department of Energy. The U.S. government has certain rights in the invention.

FIELD

The invention generally relates to batteries, and more particularly to the management of a secondary battery.

BACKGROUND

Rechargeable lithium batteries are attractive energy storage devices for portable electric and electronic devices and electric and hybrid-electric vehicles because of their high specific energy compared to other electrochemical energy storage devices. A typical lithium cell contains a negative electrode, a positive electrode, and a separator located between the negative and positive electrodes. Both electrodes contain active materials that react with lithium reversibly. In some cases, the negative electrode may include lithium metal, which can be electrochemically dissolved and deposited reversibly. The separator contains an electrolyte with a lithium cation, and serves as a physical barrier between the electrodes such that none of the electrodes are electrically connected within the cell.

Typically, during charging, there is generation of electrons at the positive electrode and consumption of an equal amount of electrons at the negative electrode. During discharging, opposite reactions occur.

During repeated charge/discharge cycles of the battery undesirable side reactions occur. These undesirable side reactions result in the reduction of the capacity of the battery to provide and store power.

SUMMARY

Traditional approaches to managing the undesirable side reactions in a battery include limiting (or otherwise controlling/regulating) the rate of charge/discharge of the battery in an attempt to minimize the undesired effects. These efforts result can results in extended charge times and peak power reduction. Thus, there is a need for a system and method for the determination of the states and parameters within a secondary battery allowing the battery management system to efficiently regulate the operation of the battery.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure are related to systems and methods for implementing a battery management system that estimates and predicts various states of the battery by applying, for example, an extended Kalman filter.

In some embodiments, the invention provides a method of managing a battery system. The battery system includes a battery cell and a sensor configured to measure battery cell characteristics such as, for example, voltage, current, and temperature. A state of health (SOH) and state of charge (SOC) of the battery cell are estimated at a first time by applying a physics-based battery model that applies differential algebraic equations to account for physical parameters relating to the chemical composition of the battery cell. The estimated state of health and state of charge of the battery are updated based on the battery cell characteristics measured by the sensor. The operation of the battery (e.g., the charging and discharging) are then regulated by the battery management system based on the updated state of health and state of charge.

In another embodiment, the invention provides a method of managing a battery system, the battery system including at least one battery cell, at least one sensor configured to measure at least one characteristic of the battery cell (such as voltage, current and temperature), and a battery management system including a microprocessor and a memory. At least one state of the at least one battery cell is estimated at a first time by applying a physics-based battery model that applies differential algebraic equations to account for physical parameters of a chemical composition of the at least one battery cell. At least one measured characteristic of the battery at a first time is received by the battery management system from the sensor. The at least one state of the at least one battery cell is then updated based on the at least one measured characteristic of the battery at the first time. The operation of the battery (e.g., the charging or discharging) is then regulated by the battery management system based on the at least one estimated state.

The details of one or more features, aspects, implementations, and advantages of this disclosure are set forth in the accompanying drawings, the detailed description, and the claims below.

DETAILED DESCRIPTION

One or more specific embodiments will be described below. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1A:
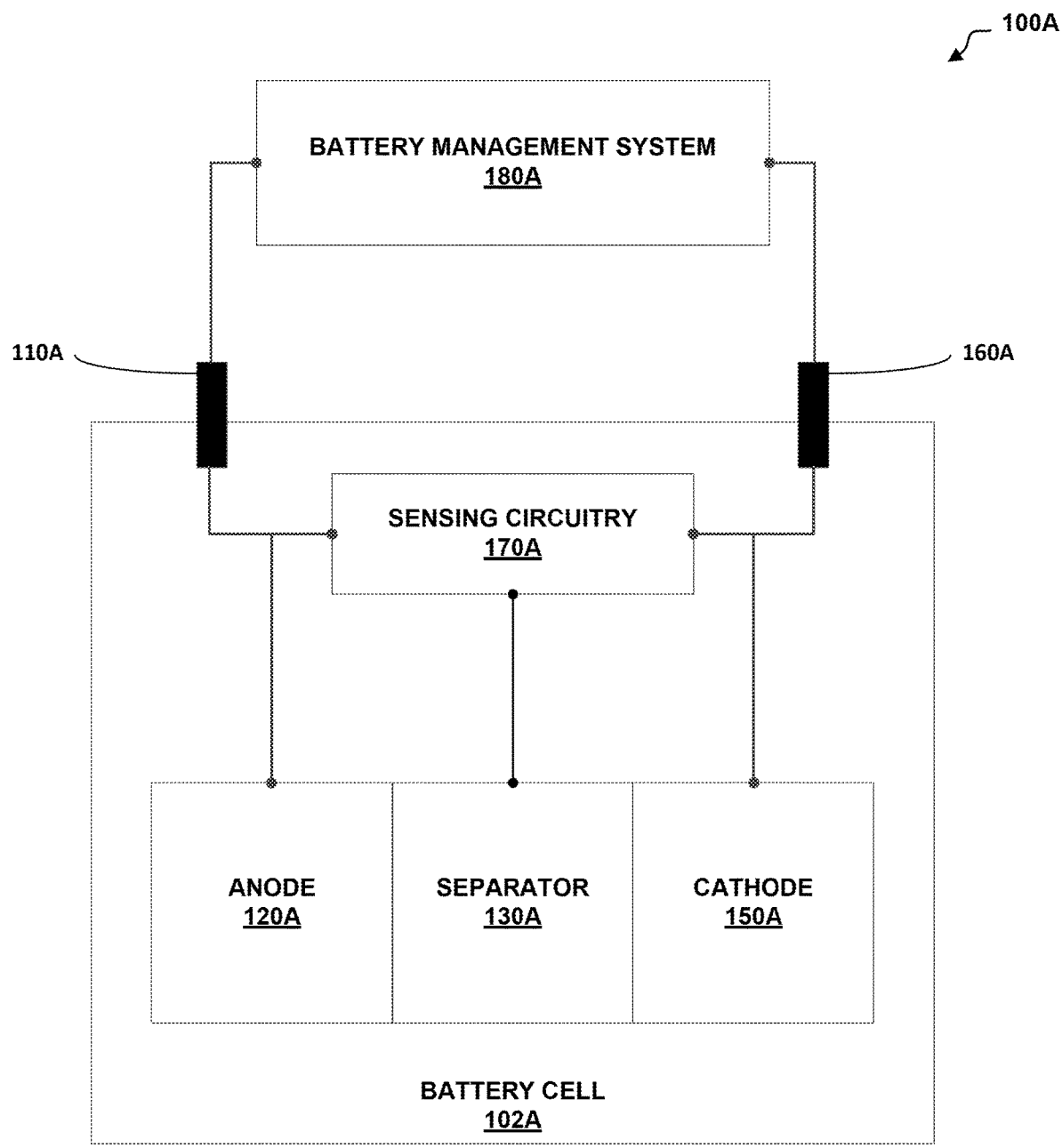
FIG. 1A is a block diagram of a battery system including a battery cell and a battery management system with sensing circuitry incorporated into the battery cell, in accordance with some embodiments.

An embodiment of a battery system 100A is shown in FIG. 1A. The battery system 100A includes an anode tab 110A, an anode 120A, a separator 130A, a cathode 150A, a cathode tab 160A, a sensing circuitry 170A, and a battery management system 180A. In some examples, the separator 130A may be an electrically insulating separator. In some embodiments, the electrically insulating separator comprises a porous polymeric film. In various embodiments the thickness dimension of the components of a battery cell 102A may be for the anode 120A about 5 to about 110 micrometers, for the separator 130A less than about 50 micrometers or in certain embodiments less than about 10 micrometers, and for the cathode 150A about 50 to about 110 micrometers.

During the discharge of the battery cell 102A, lithium is oxidized at the anode 120A to form a lithium ion. The lithium ion migrates through the separator 130A of the battery cell 102A to the cathode 150A. During charging the lithium ions return to the anode 120A and are reduced to lithium. The lithium may be deposited as lithium metal on the anode 120A in the case of a lithium anode 120A or inserted into the host structure in the case of an insertion material anode 120A, such as graphite, and the process is repeated with subsequent charge and discharge cycles. In the case of a graphitic or other Li-insertion electrode, the lithium cations are combined with electrons and the host material (e.g., graphite), resulting in an increase in the degree of lithiation, or "state of charge" of the host material. For example, $x\, Li^+ + x\, e^- + C_6 \rightarrow Li_xC_6$.

The anode 120A may comprise an oxidizable metal, such as lithium or an insertion material that can insert Li or some other ion (e.g., Na, Mg, or other suitable ion). The cathode 150 may comprise various materials such as sulfur or sulfur-containing materials (e.g., polyacrylonitrile-sulfur composites (PAN-S composites), lithium sulfide ($Li_2S$)); vanadium oxides (e.g., vanadium pentoxide ($V_2O_5$)); metal fluorides (e.g., fluorides of titanium, vanadium, iron, cobalt, bismuth, copper and combinations thereof); lithium-insertion materials (e.g., lithium nickel manganese cobalt oxide (NMC), lithium-rich NMC, lithium nickel manganese oxide ($LiNi_{0.5}Mn_{1.5}O_4$)); lithium transition metal oxides (e.g., lithium cobalt oxide ($LiCoO_2$), lithium manganese oxide ($LiMn_2O_4$), lithium nickel cobalt aluminum oxide (NCA), and combinations thereof); lithium phosphates (e.g., lithium iron phosphate ($LiFePO_4$)).

The particles may further be suspended in a porous, electrically conductive matrix that includes polymeric binder and electronically conductive material such as carbon (carbon black, graphite, carbon fiber, etc.). In some examples, the cathode may comprise an electrically conductive material having a porosity of greater than 80% to allow the formation and deposition/storage of oxidation products such as lithium peroxide ($Li_2O_2$) or lithium sulfide, ($Li_2S$) in the cathode volume. The ability to deposit the oxidation product directly determines the maximum power obtainable from the battery cell. Materials which provide the needed porosity include carbon black, graphite, carbon fibers, carbon nanotubes, and other non-carbon materials. The pores of the cathode 150A, separator 130A, and anode 120A are filled with an ionically conductive electrolyte that contains a salt such as lithium hexafluorophosphate ($LiPF_6$) that provides the electrolyte with an adequate conductivity which reduces the internal electrical resistance of the battery cell. The electrolyte solution enhances ionic transport within the battery cell 120A. Various types of electrolyte solutions are available including, non-aqueous liquid electrolytes, ionic liquids, solid polymers, glass-ceramic electrolytes, and other suitable electrolyte solutions.

The separator 130A may comprise one or more electrically insulating ionic conductive materials. In some examples, the suitable materials for separator 130A may include porous polymers, ceramics, and two dimensional sheet structures such as graphene, boron nitride, and dichalcogenides. In certain examples the pores of the separator 130 may be filled with an ionically conductive electrolyte that contains a lithium salt such as lithium hexafluorophosphate ($LiPF_6$) that provides the electrolyte with an adequate conductivity which reduces the internal electrical resistance of the battery cell.

The battery management system 180A is communicatively connected to the battery cell 102A. In one example, the battery management system 180A is electrically connected to the battery cell 102A via electrical links (e.g., wires). In another example, the battery management system 180A may be wirelessly connected to the battery cell 102A via a wireless communication network. The battery management system 180A may include for example a microcontroller (with memory and input/output components on a single chip or within a single housing) or may include separately configured components, for example, a microprocessor, memory, and input/output components. The battery management system 180A may also be implemented using other components or combinations of components including, for example, a digital signal processor (DSP), an application specific integrated circuit (ASIC), a field-programmable gate array (FPGA), or other circuitry. Depending on the desired configuration, the processor may include one or more levels of caching, such as a level cache memory, one or more processor cores, and registers. The example processor core may include an arithmetic logic unit (ALU), a floating point unit (FPU), or any combination thereof. The battery management system 180A may also include a user interface, a communication interface, and other computer implemented devices for performing features not defined herein may be incorporated into the system. In some examples, the battery management system 180A may include other computer implemented devices such as a communication interface, a user interface, a network communication link, and an interface bus for facilitating communication between various interface devices, computing implemented devices, and one or more peripheral interfaces to the microprocessor.

In the example of FIG. 1A, a memory of the battery management system 180 stores computer-readable instructions that, when executed by the electronic processor of the battery management system 180A, cause the battery management system and, more particularly the electronic processor, to perform or control the performance of various functions or methods attributed to battery management system 180A herein (e.g., calculate a state or parameter of the battery system, regulate the operation of the battery system, detect an internal short from a dendrite formation). The memory may include any transitory, non-transitory, volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital or analog media. The functions attributed to the battery management system 180A herein may be embodied as software, firmware, hardware or any combination thereof. In one example, the battery management system 180A may be embedded in a computing device and the sensing circuitry 170A is configured to communicate with the battery management system 180A of the computing device external to the battery cell 102A. In this example, the sensing circuitry 170A is configured to have wireless and/or wired communication with the battery management system 180A. For example, the sensing circuitry 170A and the battery management system 180A of the external device are configured to communicate with each other via a network. In yet another example, the battery management system 180A is remotely located on a server and the sensing circuitry 170A is configured to transmit data of the battery cell 102A to the battery management system 180A. In the above examples, the battery management system 180A is configured to receive the data and send the data to an electronic device for display as human readable format. The computing device may be a cellular phone, a tablet, a personal digital assistant (PDA), a laptop, a computer, a wearable device, or other suitable computing device. The network may be a cloud computing network, a server, a wireless area network (WAN), a local area network (LAN), an in-vehicle network, a cloud computing network, or other suitable network.

The battery management system 180A is configured to receive data from the sensing circuitry 170A including current, voltage, and/or resistance measurements. Battery management system 180A is also configured to determine a condition of the battery cell 102A. Based on the determined condition of battery cell 102A, the battery management system 180A may alter the operating parameters of the battery cell 102A to maintain the internal structure of the battery cell 102A. The battery management system 180A may also notify a user of the condition of the battery cell 102A.

Figure 1B:
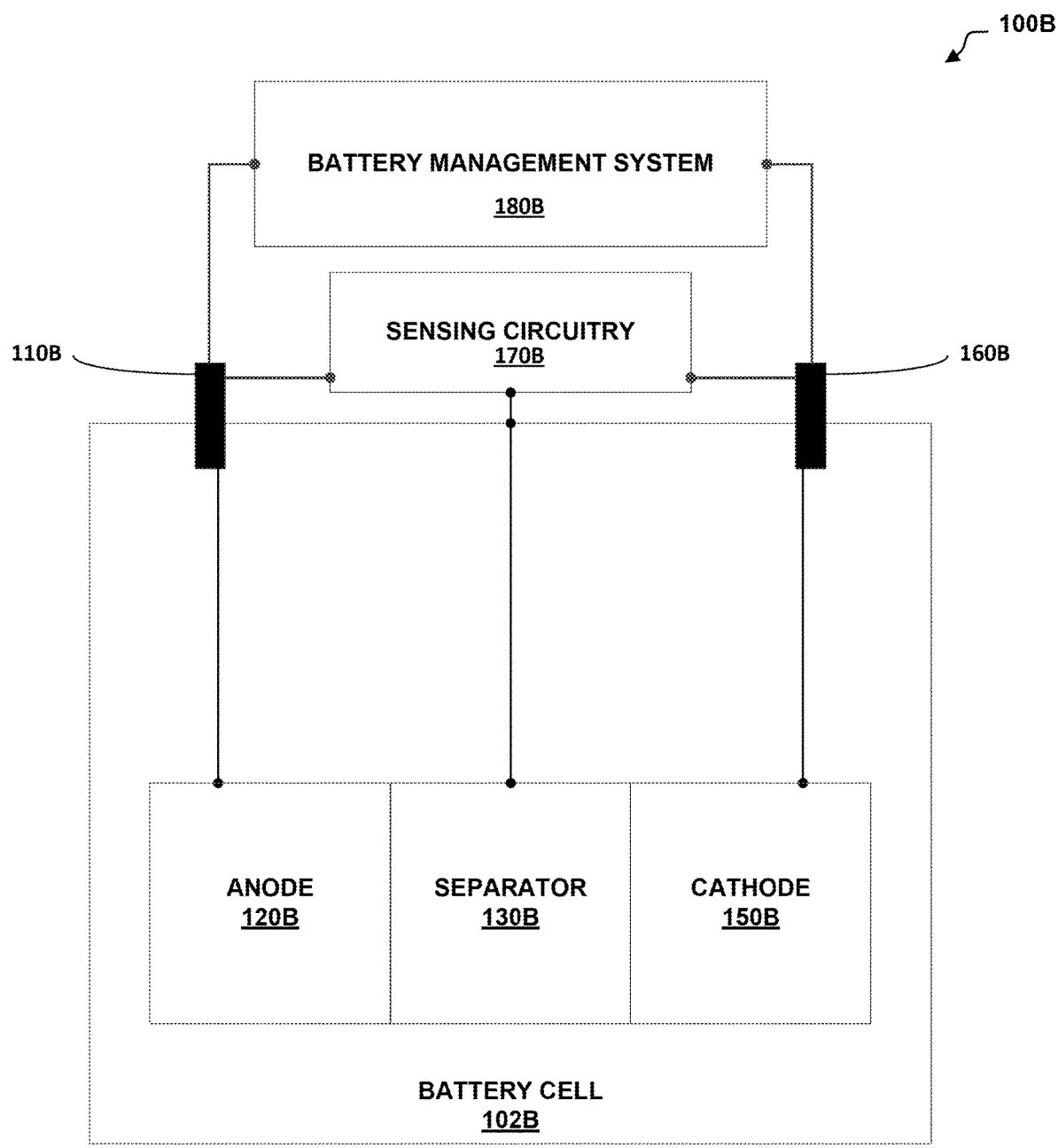
FIG. 1B is a block diagram of another battery system with the sensing circuitry provided external to the battery cell, in accordance with other embodiments.

In other embodiments, the physical placement and configuration of various components may be modified. For example, FIG. 1B illustrates another example of a battery system 100B that includes a battery cell 102B, an anode tab 110B, an anode 120B, a separator 130B, a cathode 150B, a cathode tab 160B, a sensing circuitry 170B, and a battery management system 180B. However, in the example of FIG. 1B the sensing circuitry 170B is external to the battery cell 102B and may be incorporated within the same housing as the battery management system 180B.

In some embodiments the battery cell 102A, 102B may be closed system. In such a system after the battery cell 102A, 102B is produced the casing is sealed to prevent external elements, such as air and moisture, from entering the battery cell 102A, 102B and potentially causing degradation of components resulting in reduced performance and shorter life. In the discussion below, examples that refer to components in both battery system 100A and battery system 100B will use the reference numeral without the A or B designation (e.g., anode 120 instead of anode 120A and anode 120B).

However, a closed battery cell 102 presents various challenges to the battery management system 180. The closed system does not allow the direct observation of the condition of the components of the battery cell 102. Instead, conditions as monitored and measured by the sensing circuitry 170 may be processed or evaluated to determine various characteristics of the battery cell 102, such as voltage, current, resistance, power, temperature and combinations thereof, during operation or while at rest, and pass those measured characteristics to a battery management system 180 which can interpret the measured characteristics in order to determine the condition of the battery cell 102.

Various models have been developed to model the electrochemical reactions occurring within the battery cell 102. One example, was developed by Fuller, Doyle, and Newman, (the Newman Model), (*J. Electrochem. Soc.*, Vol. 141, No. 1, January 1994, pp. 1-10), the contents of which are hereby incorporated by reference in their entirety. The Newman Model provides a mathematical model which can be used to estimate the electrochemical processes occurring within the battery cell 102B based on the measured characteristics.

The charge transfer reactions at the anode 120, and cathode 150, may be modelled by an electrochemical model, such as the Newman Model, providing the basis to describe various battery cell 102 parameters during both the charging and discharging of the battery cell 102. For example, the Newman Model may allow the estimation of various parameters including cathode particle radius, which can vary due to the degree of lithiation of the cathode 150, which also may be called the state-of-charge of the battery cell 102, anode particle radius, ion diffusion rates in the anode 120, cathode 150, and electrolyte, intercalation current and transference number, solution conductivity in the anode 120, cathode 150, and electrolyte, cell porosity of the anode 120 and cathode 150, and equilibrium potential of the anode 120 and cathode 150.

Physics based electrochemical models, such as the Newman Model, may include ordinary and partial differential equations (PDEs) to describe the behavior of the various parameters within the battery cell 102. The Newman Model is an electrochemical-based model of the actual chemical and electrical processes occurring in the Li-ion batteries. However, the full Newman Model is extremely complex and requires a large number of immeasurable physical parameters to be identified. Identification of such large set of parameters involved in the nonlinear PDE and differential algebraic equations (DAEs) with current computational capacity is impractical. This gives rise to various electrochemical models that approximate the dynamics of the Newman Model.

For example, the Reduced-Order-Model (ROM), Mayhew, C.; Wei He; Kroener, C.; Klein, R.; Chaturvedi, N.; Kojic, A., "Investigation of projection-based model-reduction techniques for solid-phase diffusion in Li-ion batteries," American Control Conference (ACC), 2014, pp. 123-128, 4-6 Jun. 2014, the contents of which are hereby incorporated by reference in their entirety, allows the model order reduction of the Newman Model of Li-ion cells while retaining the complete model structure of the of the baseline cell. The ROM of the Newman Model is able to accurately predict behavior of a truth model, compared to less realistic approximate models such as Single Particle Model, while reducing computation time and memory requirements. The Newman Model reduction by ROM, introduces a large number of states and parameters involved in highly nonlinear partial differential equations and differential algebraic equations of the ROM dynamical system. This contributes to the complexity of the parameter and state identification process. Herein we describe methods of parameter and state estimation for the highly nonlinear and complex ROM. These methods are based on online reception of measurement data and achieve a high speed of estimation.

One specific method that can be used for state and parameter is the Extended Kalman Filter (EKF). An EKF describes the process model as a nonlinear time varying model in discrete time, but uses a local linearization at each time step. The set of outputs from the electrochemical model via the EKF can include estimation of both rapidly varying states of the battery cell 102 and estimation of slowly varying parameters of the battery cell 102. In some embodiments the state of the battery cell 102 in combination with the present input to the mathematical model allows the model to predict the present output of the battery cell 102. States of a battery cell may for example include the state-of charge (e.g., for a lithium battery the degree of lithiation) or overpotentials. Parameters of the battery cell 102 typically vary more slowly over time than the states of the battery cell 102. Additionally, a parameter may not be required for the model to predict the present output of the battery cell 102. Instead knowledge of the parameters of battery cell, which may be called the state-of-health of the battery, relate to the long term functioning of the battery cell 102. Additionally, some embodiments comprise parameters which are not directly determinable from the measurement of the current battery cell 102 characteristics. Examples of battery cell 102 parameters include the volume fractions of active materials in the anode and cathode, total cyclable lithium in the cell, electrolyte conductivity and radii of particles in the electrodes.

Figure 2A:
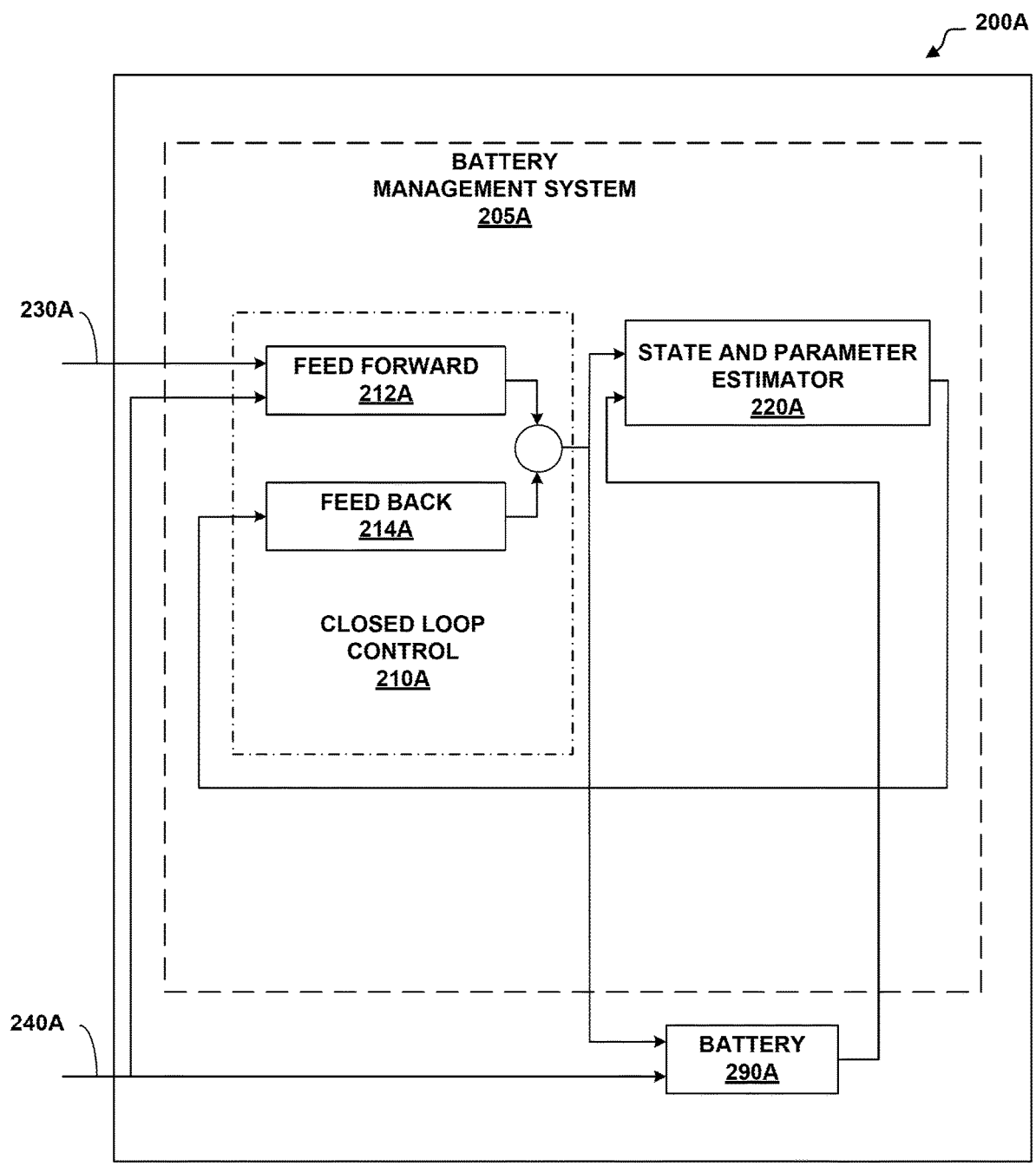
FIG. 2A is a functional block diagrams of a battery system that applies a combined estimation structure to jointly estimate both physical parameters of the battery cell and battery state information that are then used by a controller to regulate battery operation, in accordance with some embodiments.

An embodiment of a battery system 200A is shown in FIG. 2A. The battery system 200 includes a battery management system 205A that includes a closed loop control module 210A and a state and parameter estimator 220A. The closed loop control module 210A comprises a feedforward module 212A and a feedback module 214A. The battery system 200A additionally comprises a battery 290A which is in operable communication with the battery management system 205A. In some embodiments the battery 290 may comprise one or more battery cells 102. The battery system 200A may be in operable communication with external sources of inputs to the battery system 200A. A desired output 230A by an external source may be input to the battery management system 205A. An open-loop command 240A may also be applied to the battery system 200A via the battery management system 205A and/or directly to the battery 290A.

The battery management system 205A can comprise the components previously described for the battery management system 180 of FIG. 1A. Additionally, in certain embodiments of battery system 200A the battery management system 205A comprises a closed loop control module 210A which further comprises a feedforward module 212A and a feedback module 214A. The feedforward module 212A is in operable communication with the state and parameter estimator 220A as well as with external sources which can provide as inputs various commands such as desired outputs 230A and/or open loop commands 240A. The feedforward module 212A may provide at least one control signal to the battery 290A. The feedforward module 212 may also provide at least one control signal to the state and parameter estimator 220A.

The feedback control module 214A is in operable communication with the state and parameter estimator 220A. The feedback control module 214A receives the estimated states and parameters calculated by the state and parameter estimator 220A and may provide at least one control signal to the battery 290A. The feedback control module 214A may also provide at least one control signal to the state and parameter estimator 220A.

Figure 2B:
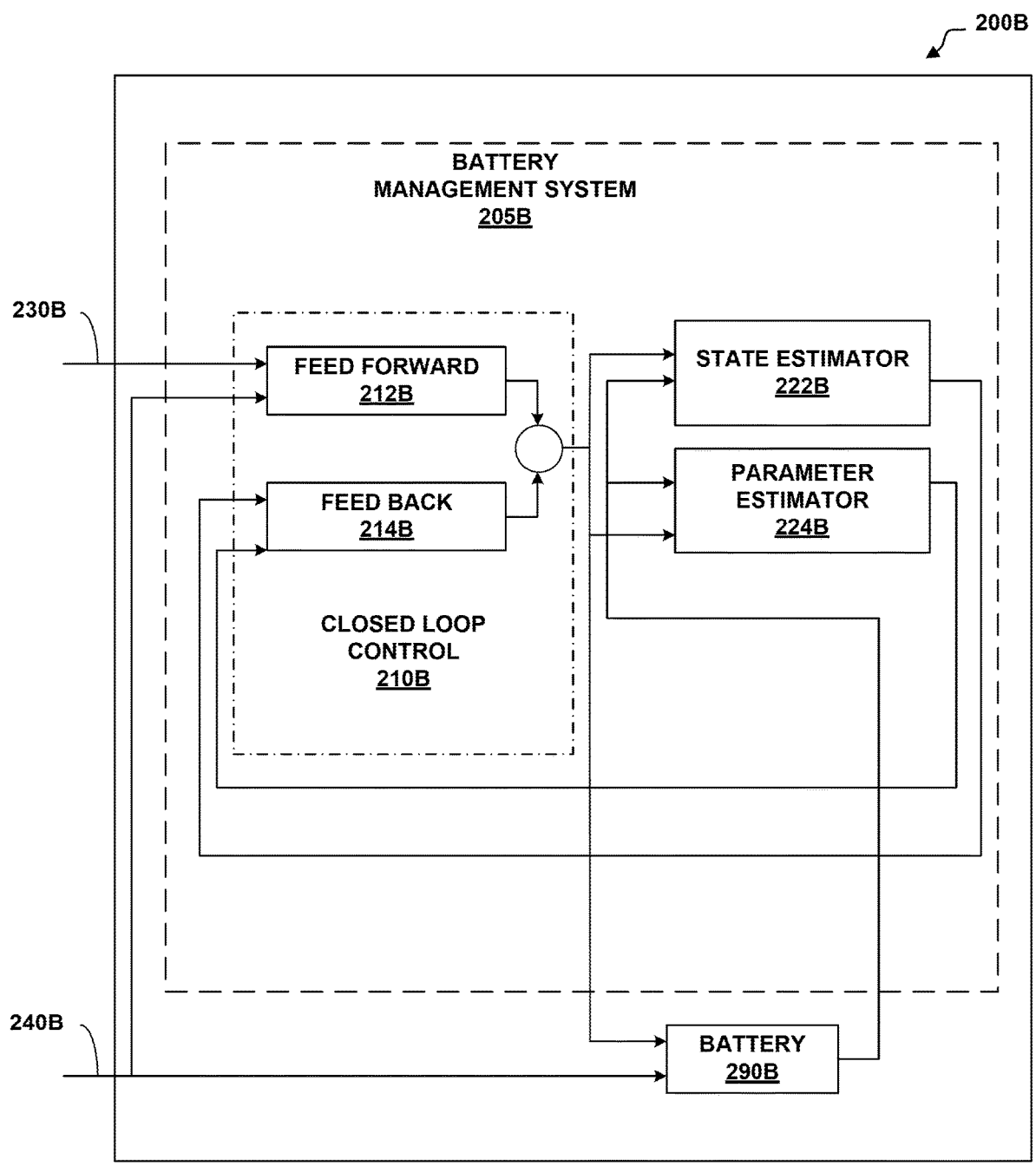
FIG. 2B is a functional block diagram of a battery system that estimates physical parameters of the battery cell and battery state information separately, in accordance with some embodiments.

Another embodiment of a battery system 200B is shown in FIG. 2B. FIG. 2B is identical to FIG. 2A except the state and parameter estimator 220A of FIG. 2A is replaced by a state estimator 222B and a parameter estimator 224B. The state estimator 222B and parameter estimator 224B subsequently provide state and parameter estimates to the feedback control module 214B in similar manner to that described for the state and parameter estimator 220A of FIG. 2A.

The closed loop control module 210B includes both a feedforward module 212B and feedback module 214B. The closed loop control module 210B may also include set points received from open-loop sources, such as external sources. The closed loop control module 210B supplies at least one control signal based on the feedforward module 212B and feedback module 214B. The feedforward component may be derived from a mathematical model, or from pre-determined set points. The feedback component is based on internal state and parameter estimates based on a physical model, such as from an electrochemical model of the battery 290B.

In the example of FIG. 2A the state and parameter estimator 220A may be an EKF-based estimator that simultaneously estimates the states and parameters of the battery 290A at every time step. In order to make the overall implementation less computationally intensive, dual estimation may be employed such as in the example of FIG. 2B (i.e., where states and parameters are estimated separately). By separating the estimation into state estimation 222 and parameter estimation 224 the computational intensity may be reduced. The rate of change of the states of the battery systems 200A and 200B is typically faster than the rate of change of the parameters of the battery systems 200A and 200B. In some embodiments the frequency of updates of the parameters of the battery system 200B is less than the frequency of updates of the states of the battery system 200B.

In some embodiments, the separation of state and parameter estimation into separate estimators 222B and 224B may allow one or both of the state estimator 222B and/or parameter estimator 224B to be located remotely to the battery 290B. In certain embodiments the state estimator 222B and/or parameter estimator 224B may be in operable communication with the other elements of the battery system 200B by wireless communication.

Figure 3:
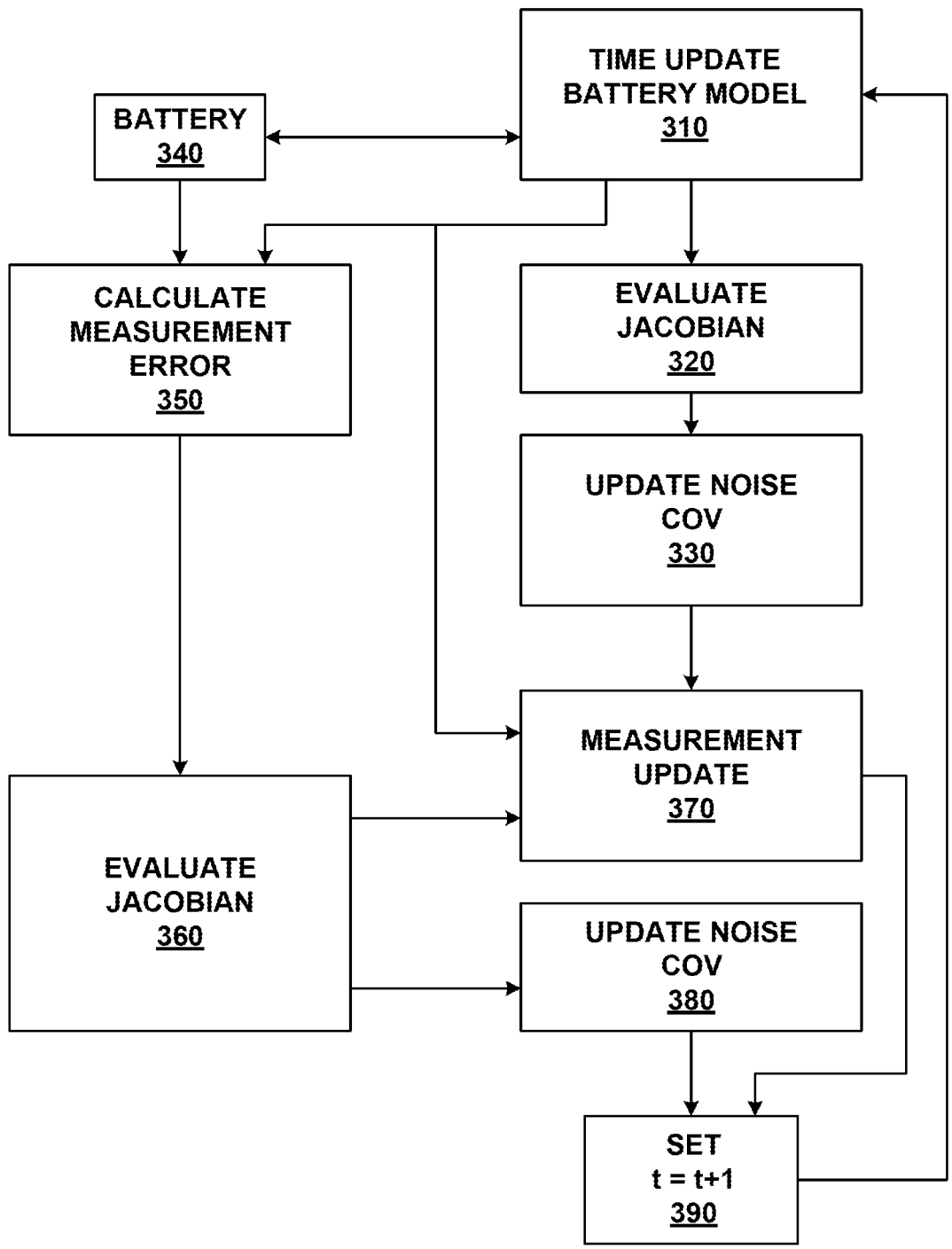
FIG. 3 is a flow chart of a method for operating a battery management system to estimate battery states and parameters, in accordance with some embodiments.

An example of a method of estimating parameters and states using physics-based techniques by performing a time update and a measurement update is shown in FIG. 3.

At the first time step, an initial estimate of the states and parameters are defined as part of the time update (step 310). The Jacobian of the system is evaluated (step 320) and an initial estimate of the noise covariance matrix is determined (step 330). At time t, given the current state and parameter estimates based on the most recent measurement, the time update (step 310) involves simulating the physics-based battery model over one time step, (t+1).

For this example, the system modelling/estimation is performed based on differential algebraic equations (DAEs)—however, the estimation may be applied to other model forms in other implementations. The DAE model can be represented by the equations:

$$\dot{x}_1 = f(x_1, x_2, I, P) \quad (1)$$

$$\dot{P} = 0 \quad (2)$$

$$0 = g(x_1, x_2, I, P) \quad (3)$$

$$y = h(x_1, x_2, I, P) \quad (4)$$

where $x_1$ represents the differential states, $x_2$ represents the algebraic states, P represents the parameter vector and I represents the current inputs that are used to control battery operation.

As noted above, updating the covariance matrix (step 330) requires derivation of the Jacobian of the system with respect to the differential states and parameters (step 320). Since the model is defined in terms of a set of DAEs rather than ordinary differential equations (ODEs), a modified Jacobian is used as represented by the equation:

$$J_f = \begin{bmatrix} f_{x_1} - \dfrac{f_{x_2} g_{x_1}}{g_{x_2}} & f_P - \dfrac{f_{x_2} g_P}{g_{x_2}} \\ 0 & 0 \end{bmatrix} \quad (5)$$

where $f_{x_1}$, $f_{x_2}$, $f_P$, $g_{x_1}$, $g_{x_2}$, and $g_P$ represent derivatives of f and g with respect to $x_1$, $x_2$ and P. These derivatives can be obtained either analytically based on the functional forms of f and g, or numerically through simulation of the model.

After the Jacobian of the system is derived (step 320), the noise covariance matrix is then updated (step 330) as represented by the equation:

$$COV_{t+1|t} = J_f COV_{t|t} J_f^T + Q \quad (6)$$

where $COV_{t+1|t}$ is the covariance at t+1, $J_f$ is the Jacobian of f, $J_f^T$ is the transpose of the Jacobian of f, $COV_{t|t}$ is the covariance at t, and Q is a positive definite matrix that can either be fixed, or time-varying.

The time-update estimate is further updated in the measurement update step based on available measurements of the characteristics of the battery 290 or battery cell 102 (step 370). The characteristics may include, but are not limited to, a voltage, current, resistance, temperature, or combinations thereof of the battery 290 or battery cell 102. As subsequent measurements are obtained, the model prediction can be used to obtain a measurement error 350 (i.e., an error between a measured characteristic of the battery 340 and a corresponding value as determined by the DAE model) (step 350). This calculated measurement error is then used by the system to update and refine the measurement update (step 370) as discussed in further detail below.

Again, with a DAE based system, a modified Jacobian ($J_h$) is derived (step 260) with respect to the output equation as represented by the equation:

$$J_h = \begin{bmatrix} h_{x_1} - \dfrac{h_{x_2} g_{x_1}}{g_{x_2}} & h_P - \dfrac{h_{x_2} g_P}{g_{x_2}} \end{bmatrix} \quad (7)$$

where $h_{x_1}$, $h_{x_2}$, $h_P$, $g_{x_1}$, $g_{x_2}$, and $g_P$ represent derivatives of h and g with respect to $x_1$, $x_2$ and P. These derivatives can be obtained either analytically based on the functional forms of h and g, or numerically through simulation of the model.

During the measurement update, the covariance matrix (obtained in step 330) and the Jacobian ($J_h$) (obtained in step 360) are used to derive the Kalman gain ($K_k$), which is represented by the equation:

$$K_k = \dfrac{COV_{t+1|t} J_h^T}{J_h COV_{t+1|t} J_h^T + R} \quad (8)$$

where $K_k$ is the Kalman gain, R is a measure of the noise associated with each element. The other variables are as defined above for Equation (6).

The measurement update (step 370) causes the Kalman gain ($K_k$) to act on the measurement error to then provide up-to-date, error corrected state and parameter estimates as represented by the equation:

$$\begin{bmatrix} \hat{x} \\ \hat{P} \end{bmatrix}_{t+1|t+1} = \begin{bmatrix} \hat{x} \\ \hat{P} \end{bmatrix}_{t+1|t+1} + K_k y_{err} \quad (9)$$

The covariance matrix for t+1 is then updated again based on the measurements at t+1 (step 380), as represented by the equation:

$$COV_{t+1|t+1} = (I - K_k J_h) COV_{t+1|t} \quad (10)$$

The updated states, parameters, and COV are then used as the basis (t) for the next time update 310 as the next iteration of the estimation is performed.

While the process of FIG. 3 describes the joint estimation of states and parameters such as in the example of FIG. 2A, it can be extended to a dual estimation framework of FIG. 2B where the states and parameters are estimated separately in similar fashion with two different EKFs. In the discussion below, examples that refer to components in both battery system 200A and battery system 200B will use the reference numeral without the A or B designation. Simulation and experimental data shows that different parameters and states of the electro-chemical model have different noise levels and different influence on the output. The noise and influence levels depend on the battery's state of operation. Various notions of state/parameter sensitivity can be used to determine which states/parameters are most critical to estimate, as well as to determine the noise covariance matrices that are used to evaluate the filter gains on each time step. For example, different notions of states and parameters' sensitivity that may be employed include a) partial derivatives of output versus states and parameters, and b) variations in the output over one drive cycle due to perturbation in states and parameters to evaluate the filter gain during each time step.

The accurate estimation of the states and parameters of a battery 290 may allow the battery management system 205 to regulate the operation of the battery 290 such that the life and performance of the battery will be enhanced. For example, the battery management system 205 by minimizing the change in parameters of the battery 290 may allow the battery 290 to undergo an increased number of charge/discharge cycles prior to replacement. In some embodiments the battery management system 205 may regulate the charging of the battery 290 to allow for the efficient intercalation of the oxidizable species rather than deposition on the surface of the electrode. This may minimize the formation of dendrites thus limiting the possibility of the formation of an internal short within the battery 290. In other embodiments the battery management system 205 may regulate the discharge of the battery 290 in order to obtain for example, the maximum total power output from the battery 290.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the spirit and scope of this disclosure.

It is believed that embodiments described herein and many of their attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method of managing a battery system, the battery system including at least one battery cell, at least one sensor configured to measure at least one characteristic of the battery cell, and a battery management system including a microprocessor and a memory, the method comprising
estimating, by the battery management system, a state of charge of the at least one battery cell at a first time by applying an electrochemical battery model,
wherein applying the electrochemical battery model includes using differential algebraic equations to estimate the state of charge of the at least one battery cell at the first time based at least in part on a previously determined state of charge and a previously determined value of a slowly varying parameter indicative of physical changes to a chemical composition of battery cell materials of the at least one battery cell
wherein applying the electrochemical battery model provides an estimated value of the slowly varying parameter at the first time;
receiving by the battery management system from the at least one sensor, a measured value of at least one measured characteristic of the battery at the first time;
updating, by the battery management system, the state of charge of the at least one battery cell at the first time based on the at least one measured characteristic of the battery at the first time; and
regulating, by the battery management system, at least one of charging or discharging of the battery based on the updated state of charge of the at least one battery cell.

2. The method of claim 1, wherein estimating the state of charge of the at least one battery cell includes applying an extended Kalman filter.

3. The method of claim 2, wherein updating the state of charge of the at least one battery cell further includes
determining a noise covariance; and
adjusting a gain of the extended Kalman filter based on the determined noise covariance.

4. The method of claim 3, further comprising:
estimating a value of the at least one measured characteristic of the battery at the first time using the electrochemical battery model; and
calculating a measurement error based on the measured value of the at least one measured characteristic of the battery at the first time and the estimated value of the at least one measured characteristic of the battery at the first time, and
wherein updating the state of charge of the at least one battery cell further includes updating the state of charge of the at least one battery cell based on the adjusted gain of the extended Kalman filter and the calculated measurement error.

5. The method of claim 4, wherein adjusting the gain of the extended Kalman filter includes calculating an adjusted gain based on the equation:

$$K_k = \frac{COV_{t+1|t} J_h^T}{J_h COV_{t+1|t} J_h^T + R}$$

wherein $K_k$ is the gain of the extended Kalman filter, R is a measure of noise associated with each element of the Kalman filter, $J_h$ a Jacobian calculated based on the measurement error, and COV is a calculated covariance matrix of the electrochemical battery model.

6. The method of claim 2, wherein applying the extended Kalman filter includes using a single extended Kalman filter to jointly estimate both the state of charge of the at least one battery cell and the slowly varying parameter of the at least one battery cell.

7. The method of claim 2, wherein applying the extended Kalman filter includes using a first extended Kalman filter to estimate the state of charge of the at least one battery cell and using a second extended Kalman filter to separately estimate the slowly varying parameter of the at least one battery cell.

8. The method of claim 1, wherein regulating the at least one of charging or discharging of the battery based on the state of charge includes regulating a rate of charge or discharge.

9. A battery management system comprising a processor and a memory storing instructions that, when executed by the processor, cause the battery management system to:
estimate a state of charge of the at least one battery cell at a first time by applying an electrochemical battery model,
wherein applying the electrochemical battery model includes using differential algebraic equations to estimate the state of charge of the at least one battery cell at the first time based at least in part on a previously determined state of charge and a previously determined value of a slowly varying parameter indicative of a physical change in a chemical composition of battery cell materials of the at least one battery cell,
wherein applying the electrochemical battery model provides an estimated value of the slowly varying parameter at the first time;
receive a measured value of at least one measured characteristic of the battery from a sensor associated with the at least one battery cell at the first time;
update the state of charge of the at least one battery cell at the first time based on the at least one measured characteristic of the battery at the first time; and
regulate at least one of charging or discharging of the battery based on the updated state of charge of the at least one battery cell.

10. The battery management system of claim 9, wherein the memory stores instructions that, when executed by the processor, cause the battery management system to estimate the state of charge of the at least one battery cell at the first time by applying an extended Kalman filter.

11. The battery management system of claim 10, wherein the memory stores instructions that, when executed by the processor, cause the battery management system to update the state of charge of the at least one battery cell by
determining a noise covariance; and
adjusting a gain of the extended Kalman filter based on the determined noise covariance.

12. The battery management system of claim 11, wherein the memory stores instructions that, when executed by the processor, further cause the battery management system to:

estimate a value of the at least one measured characteristic of the battery at the first time using the electrochemical battery model; and calculate a measurement error based on the measured value of the at least one measured characteristic of the battery at the first time and the estimated value of the at least one measured characteristic of the battery at the first time, and wherein the instructions, when executed by the processor, cause the battery system to update the state of charge of the at least one battery cell by updating the state of charge of the at least one battery cell based on the adjusted gain of the extended Kalman filter and the calculated measurement error.

13. The battery management system of claim 12, wherein the memory stores instructions that, when executed by the processor, cause the battery management system to adjust the gain of the extended Kalman filter by calculating an adjusted gain based on the equation:

$$K_k = \frac{COV_{t+1|t} J_h^T}{J_h COV_{t+1|t} J_h^T + R}$$

wherein $K_k$ is the gain of the extended Kalman filter, R is a measure of noise associated with each element of the Kalman filter, $J_h$ a Jacobian calculated based on the measurement error, and COV is a calculated covariance matrix of the electrochemical battery model.

14. The battery management system of claim 10, wherein the memory stores instructions that, when executed by the processor, cause the battery management system to apply the extended Kalman filter by using a single extended Kalman filter to jointly estimate both the state of charge of the at least one battery cell and the slowly varying parameter of the at least one battery cell.

15. The battery management system of claim 10, wherein the memory stores instructions that, when executed by the processor, further cause the battery management system to apply the extended Kalman filter by using a first extended Kalman filter to estimate the state of charge of the at least one battery cell and using a second extended Kalman filter to separately estimate the slowly varying parameter of the at least one battery cell.

16. The battery management system of claim 9, wherein the memory stores instructions that, when executed by the processor, cause the battery management system to regulate the at least one of charging or discharging of the battery based on the state of charge includes regulating a rate of charge or discharge.

17. The method of claim 1, wherein the slowly varying parameter of the at least one battery cell includes at least one selected from a group consisting of cathode particle radius, anode particle radius, ion diffusion rates, intercalation current and transference number, solution conductivity, cell porosity, and equilibrium potential of the anode and cathode.

18. The method of claim 1, wherein the slowly varying parameter of the at least one battery cell includes at least one selected from a group consisting of
- a volume fraction of active material in an anode of the at least one battery cell,
- a volume fraction of active material in a cathode of the at least one battery cell,
- a total cyclable lithium in the at least one battery cell, and
- a radius of particles in one or more electrodes in the at least one battery cell.

* * * * *